United States Patent
Chou et al.

(10) Patent No.: US 9,509,776 B2
(45) Date of Patent: Nov. 29, 2016

(54) METHOD AND SYSTEM FOR MANAGING AND USING SESSIONS AS RESTFUL WEB SERVICES

(75) Inventors: Wu Chou, Basking Ridge, NJ (US); Li Li, Bridgewater, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1137 days.

(21) Appl. No.: 12/978,873

(22) Filed: Dec. 27, 2010

(65) Prior Publication Data

US 2011/0302316 A1    Dec. 8, 2011

Related U.S. Application Data

(60) Provisional application No. 61/350,602, filed on Jun. 2, 2010.

(51) Int. Cl.
*G06F 15/16* (2006.01)
*H04L 29/08* (2006.01)

(52) U.S. Cl.
CPC ............... *H04L 67/14* (2013.01); *H04L 67/02* (2013.01)

(58) Field of Classification Search
CPC .............................. H04L 67/14–67/145; H04L 29/08576–29/08639
USPC .................................................. 709/227, 228
See application file for complete search history.

(56) References Cited

U.S. PATENT DOCUMENTS

| | | | |
|---|---|---|---|
| 7,139,978 B2 | 11/2006 | Rojewski et al. | |
| 7,277,408 B2 * | 10/2007 | Sorsa | 370/328 |
| 7,296,076 B1 * | 11/2007 | Portolani | 709/227 |
| 7,908,286 B2 * | 3/2011 | Krishnaprasad et al. | 707/759 |
| 8,020,195 B2 * | 9/2011 | Frost | G06F 21/31 709/227 |
| 8,028,072 B2 * | 9/2011 | George et al. | 709/227 |
| 8,275,855 B2 * | 9/2012 | Kothari et al. | 709/218 |
| 9,130,975 B2 | 9/2015 | Chou et al. | |
| 2004/0024688 A1 * | 2/2004 | Bi | G06F 21/10 705/37 |
| 2005/0193124 A1 * | 9/2005 | Chou et al. | 709/228 |
| 2005/0278728 A1 | 12/2005 | Klementiev | |
| 2006/0005132 A1 | 1/2006 | Herdeg, III | |
| 2006/0167849 A1 * | 7/2006 | Marcus | H04L 12/581 |
| 2007/0022199 A1 * | 1/2007 | Tatsubori | 709/227 |
| 2008/0126485 A1 * | 5/2008 | Wang | H04L 51/04 709/204 |

(Continued)

OTHER PUBLICATIONS

"Temporary Extended Sessions", W3C TAG mailing list, Jan. 28, 2003. Retrieved from http://lists.w3.org/Archives/Public/www-tag/2003Jan/0387.html.

(Continued)

*Primary Examiner* — Brendan Higa
(74) *Attorney, Agent, or Firm* — Sheridan Ross P.C.

(57) ABSTRACT

Disclosed herein are systems, methods, and non-transitory computer-readable storage media for managing and using sessions as RESTful web services. A session is exposed as a resource having an associated Uniform Resource Identifier (URI), and the session is composed with other services. For example, a client sends an HTTP POST request to a web server to create a session, an HTTP GET request to retrieve a representation of the session, an HTTP PUT request to update the representation of the session, and an HTTP DELETE request to delete the session so that resources within the session are reclaimed. Since the sessions are resources, the resources can be shared among clients, and the web servers knows the client states while still being stateless, making them robust and scalable. Composing web services with the common RESTful session service reduces complexity and enhances interoperability.

20 Claims, 7 Drawing Sheets

(56) References Cited

U.S. PATENT DOCUMENTS

| | | | |
|---|---|---|---|
| 2009/0006614 A1* | 1/2009 | Le et al. | 709/224 |
| 2009/0327880 A1 | 12/2009 | Ide | |
| 2011/0004878 A1* | 1/2011 | Divoux | G06F 9/4856 718/1 |
| 2011/0041140 A1 | 2/2011 | Harm et al. | |
| 2011/0078234 A1 | 3/2011 | Engel | |
| 2011/0113341 A1* | 5/2011 | Liensberger et al. | 715/738 |
| 2011/0142035 A1* | 6/2011 | Ku et al. | 370/352 |
| 2011/0264793 A1 | 10/2011 | Goldman et al. | |
| 2012/0179825 A1* | 7/2012 | Dhoolia et al. | 709/226 |
| 2012/0294301 A2* | 11/2012 | Birch et al. | 370/352 |

OTHER PUBLICATIONS

Richardson et al., "RESTful Web Services", O'Reilly Media, pp. 252-253. May 15, 2007.

ECMA-354 Standard, ECMA International, Application Session $1^{st}$ Edition, Jun. 2004.

ECMA-366 Standard, ECMA Internation, WS-Session-Web Services for Application Session Service, $3^{rd}$ Edition, Dec. 2011.

"HTTP cookie," Wikipedia, Aug. 18, 2010, retrieved from https://en.wikipedia.org/wiki/HTTP_cookie, 9 pages.

"Press Releases," MJT NET, Oct. 29, 1998 through Jan. 2, 2008, website: http://www.mjtnet.com/press-releases.htm, 11 pages.

Graham-Rowe, D., "Software that Learns by Watching," Technology Review, May 19, 2010, published by MIT, website: http://www.technologyreview.com/computing/25351/?a=f, 4 pages.

Kristol et al., "HTTP State Management Mechanism," RFC 2965, Network Working Group, Oct. 2000, 25 pages.

Safonov, A., et al., "Towards Web Macros: a Model and a Prototype System for Automating Common Tasks on the Web," dated Jun. 3, 1999, University of Minnesota, Minneapolis, Minnesota, USA, printed from website: http://zing.ncsl.nist.gov/hfweb/proceedings/safonov, 11 pages.

* cited by examiner

| URI template | methods | |
|---|---|---|
| session_factory | POST: create a session | 203 |
| | GET: return existing sessions | 204 |
| session/{session} | GET: retrieve the session | 205 |
| | PUT: update the session, i.e. suspend, resume, renew, etc. | 206 |
| | DELETE: delete the session | 207 |

FIG. 3

METHOD AND SYSTEM FOR MANAGING AND USING SESSIONS AS RESTFUL WEB SERVICES

RELATED APPLICATIONS

This application claims the benefit of U.S. Provisional Application Ser. 61/350,602 filed Jun. 2, 2010 by Wu Chou and Li Li, the contents of which are herein incorporated herein by reference.

BACKGROUND

1. Technical Field

The present disclosure relates generally to clients and servers in a data processing network, and more particularly to a data processing network using the Representational State Transfer (REST) architecture style. The disclosure more specifically relates to managing and using sessions in a data processing network providing RESTful web services.

2. Introduction

Representational State Transfer (REST) is an acronym coined in Roy Fielding's doctoral dissertation to characterize the architecture style of the World Wide Web. RESTful web services refer to distributed processes that provide services (functions) to the client software following the REST principles. See chapter 5 of Fielding, R., Architectural Styles and the Design of Network-based Software Architectures, Ph.D. Dissertation, University of California, Irvine, Calif., 2000. The World Wide Web (WWW), commonly known as the Web, is a system of interlinked hypertext documents accessed via the Internet. REST includes an abstraction of the architectural elements within the WWW, and a set of constraints applied to these architectural elements. The REST architectural elements include data elements, connectors, and components.

The REST data elements include resources, Uniform Resource Identifiers, representations, representation metadata, resource metadata, and control data. A resource is the intended conceptual target of a hypertext reference. Thus, a resource is a conceptual mapping to a set of entities, not the entity that corresponds to the mapping at any particular point in time. A Uniform Resource Identifier (URI) is a generic term for all types of names and addresses that refer to objects on the WWW. A URL (Uniform Resource Locator) is one kind of URI. A URL provides a means for locating the resource by describing its primary access mechanism (e.g., its network "location"). REST components perform actions on a resource by using a representation to capture the current or intended state of that resource and transferring that representation between components. A representation is a sequence of bytes, plus representation metadata to describe those bytes. For example, an HTML document or a JPEG image is a representation.

The REST connectors provide a generic interface for accessing and manipulating the value set of a resource, regardless of how the membership function is defined or the type of software that is handling the request. REST connectors include clients, servers, caches, resolvers, and tunnels. A dynamic name service (DNS) is an example of a resolver. A Secure Socket Layer (SSL) is an example of a tunnel.

The REST components include origin servers, gateways, proxies, and user agents. A user agent uses a client connector to initiate a request and becomes the ultimate recipient of the response. The most common example is a Web browser, which provides access to information services and renders service responses according to the application needs. An origin server uses a server connector to govern the namespace for a requested resource. It is the definitive source for representations of its resources and must be the ultimate recipient of any request that intends to modify the value of its resources. Intermediary components act as both a client and a server in order to forward, with possible translation, requests and responses. A proxy component is an intermediary selected by a client to provide interface encapsulation of other services, data translation, performance enhancement, or security protection. A gateway (a.k.a., reverse proxy) component is an intermediary imposed by the network or origin server to provide an interface encapsulation of other services, for data translation, performance enhancement, or security enforcement.

The first REST constraint is separation of the user interface concerns from the data storage concerns, in a client-server relationship. Separation of the user interface concerns from the data storage concerns improves the portability of the user interface across multiple platforms and improves scalability by simplifying the server components.

The second REST constraint is that the client-server communication must be stateless. In particular, each request from client to server must contain all of the information necessary to understand the request, and cannot take advantage of any stored context on the server. Application state is therefore kept entirely on the client. This constraint induces the properties of visibility, reliability, and scalability. Visibility is improved because a monitoring system does not have to look beyond a single request datum in order to determine the full nature of the request. Reliability is improved because it eases the task of recovering from partial failures. Scalability is improved because not having to store state between requests allows the server component to quickly free resources, and further simplifies implementation because the server doesn't have to manage resource usage across requests.

The third REST constraint is a cache constraint that the data within a response to a request be implicitly or explicitly labeled as cacheable or non-cacheable. If a response is cacheable, then a client cache is given the right to reuse that response data for later, equivalent requests.

The fourth REST constraint is a uniform interface between the client, server, and intermediate components. The software engineering principle of generality is applied to the component interface, so that the overall system architecture is simplified and the visibility of interactions is improved. Implementations are decoupled from the services they provide, which encourages independent evolvability.

The fifth REST constraint is a layered system constraint. The layered system style allows an architecture to be composed of hierarchical layers by constraining component behavior such that each component cannot "see" beyond the immediate layer with which they are interacting. By restricting knowledge of the system to a single layer, a bound is placed on the overall system complexity and substrate independence is promoted. Layers can be used to encapsulate legacy services and to protect new services from legacy clients, simplifying components by moving infrequently used functionality to a shared intermediary. Intermediaries can also be used to improve system scalability by enabling load balancing of services across multiple networks and processors.

REST also provides an option of client functionality to be extended by downloading and executing code in the form of applets or scripts. This simplifies clients by reducing the number of features required to be pre-implemented. Allowing features to be downloaded after deployment improves system extensibility. However, it also reduces visibility, and thus is only an optional feature within REST.

In general, a session is an exchange of data between an association of participants. In a distributed system, a client typically invokes a service to establish the association of the participants, and the service provides a mechanism to maintain client state across subsequent client invocations of the service during the session. For example, there are many applications of the Internet that require the creation and management of such a session. It is particularly useful in communication protocols and services because many of them, such as Session Initiation Protocol (SIP), Jingle, Parlay X and Computer Supported Telecommunications Applications (CSTA), require that a client establishes a session with the services or peers first, before data is exchanged between clients. To move communication systems into a web centric architecture, communication web services often have to integrate with various session-based protocols to connect them into the web infrastructure. Because these session-based protocols have different session formats, it is important for the integrated web services to present a uniform session interface to hide the variations and complexities from the web service clients. Without such a uniform session service, the integrated web services would be more complex and more difficult to interoperate.

Despite its importance, however, there is no standard way to establish sessions for web services. Over the years, various techniques, including the Hypertext Transfer Protocol (HTTP) cookie, URI rewrite, hidden form field, etc., have been developed to address the session issue on the Web. The lack of a common session mechanism has created confusions among web service development and has limited interoperability among web services.

The HTTP cookie is defined in Kristol et al., HTTP State Management Mechanism, Request for Comments 2965, October 2000, Network Working Group. The HTTP cookie is a mechanism for managing HTTP states. A HTTP cookie is a piece of data structure that associates an arbitrary name-value pair with a set of HTTP server data, including domain, path and ports. A cookie can be discarded when the user agent exits or expires after a certain specified duration. The cookie is set by the HTTP response when the user interacts with a web server and the set cookie is sent by the web browser back to the server when the target URL matches the domain, path and ports in the cookie. A user can also delete the remembered cookies from the web browser to prevent them from being sent.

The cookie mechanism has several problems, as pointed out by a Wikipedia article on the HTTP cookie. From the REST point of view, a HTTP cookie is not an addressable resource that can be controlled by the web service clients. As the result, there is no standard way for a client to decide or access the content of a cookie, delete a cookie from the server at will or change its expiry duration. Because of this lack of control, cookies also break the statelessness principle of REST when a client revisits URLs prior to cookie. Further details of this problem can be found at page 252 of Leonard Richardson & Sam Ruby, "RESTful Web Services," 2007, O'Reilly Media, Inc., Sebastopol, Calif.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In one aspect, the disclosure includes a method of managing and using a session as a web service. The method includes a data processor of an origin server on the Internet executing computer instructions stored on a non-transitory computer readable storage medium to perform the steps of: (a) responding to a user agent request to create a session by allocating data storage of the origin server with a representation of the session for storing session state information of the session, the representation of the session having an associated Uniform Resource Identifier (URI); (b) responding to a user agent request to update session state information by finding that the user agent request to update a session includes the associated URI, and upon finding that the user agent request to update session state information includes the associated URI, updating session state information in the data storage allocated to the representation of the session created in step (a); (c) responding to a user agent request to retrieve session state information by finding that the user agent request to retrieve session state information includes the associated URI, and upon finding that the user agent request to retrieve session state information includes the associated URI, retrieving session state information from the data storage allocated to the representation of the session created in step (a); and (d) terminating the session by de-allocating the data storage having been allocated to the representation of the session in step (a).

In another aspect, the disclosure includes a system for managing and using a session as a web service. The system includes an origin server on the Internet, the origin server having a data processor and non-transitory computer readable storage medium coupled to the data processor and storing computer instructions that when executed by the data processor perform the steps of: (a) responding to a user agent request to create a session by allocating data storage of the origin server to a representation of the session for storing session state information of the session, the representation of the session having an associated Uniform Resource Identifier (URI); (b) responding to a user agent request to update session state information by finding that the user agent request to update a session includes the associated URI, and upon finding that the user agent request to update session state information includes the associated URI, updating session state information in the data storage allocated to the representation of the session created in step (a); (c) responding to a user agent request to retrieve session state information by finding that the user agent request to retrieve session state information includes the associated URI, and upon finding that the user agent request to retrieve session state information includes the associated URI, retrieving session state information from the data storage allocated to the representation of the session created in step (a); and (d) terminating the session by de-allocating the data storage having been allocated to the representation of the session in step (a).

In a final aspect, the disclosure includes a non-transitory computer-readable storage medium storing computer instructions that, when executed by a data processor of an origin server on the Internet, perform management of a session as a web service by the steps of: (a) responding to a user agent request to create a session by allocating data storage of the origin server to a representation of the session for storing session state information of the session, the representation of the session having an associated Uniform Resource Identifier (URI); (b) responding to a user agent request to update session state information by finding that the user agent request to update a session includes the associated URI, and upon finding that the user agent request to update session state information includes the associated URI, updating session state information in the data storage allocated to the representation of the session created in step (a); (c) responding to a user agent request to retrieve session state information by finding that the user agent request to retrieve session state information includes the associated URI, and upon finding that the user agent request to retrieve session state information includes the associated URI, retrieving session state information from the data storage allocated to the representation of the session created in step (a); and (d) terminating the session by de-allocating the data storage having been allocated to the representation of the session in step (a).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates resources and associated methods of a preferred embodiment;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses a need in the art for a standard way to establish sessions for web services. As will be further described below, a client agent and a web server can be used to establish a session in a standard way so that sessions compose with other web services following the REST principles.

First will be described a basic general purpose system or computing device in FIG. 1, which can be used as a client agent or a web server to practice the concepts disclosed herein. A more detailed description of the method and system for managing and using sessions as RESTful web services will then follow.

Figure 1:
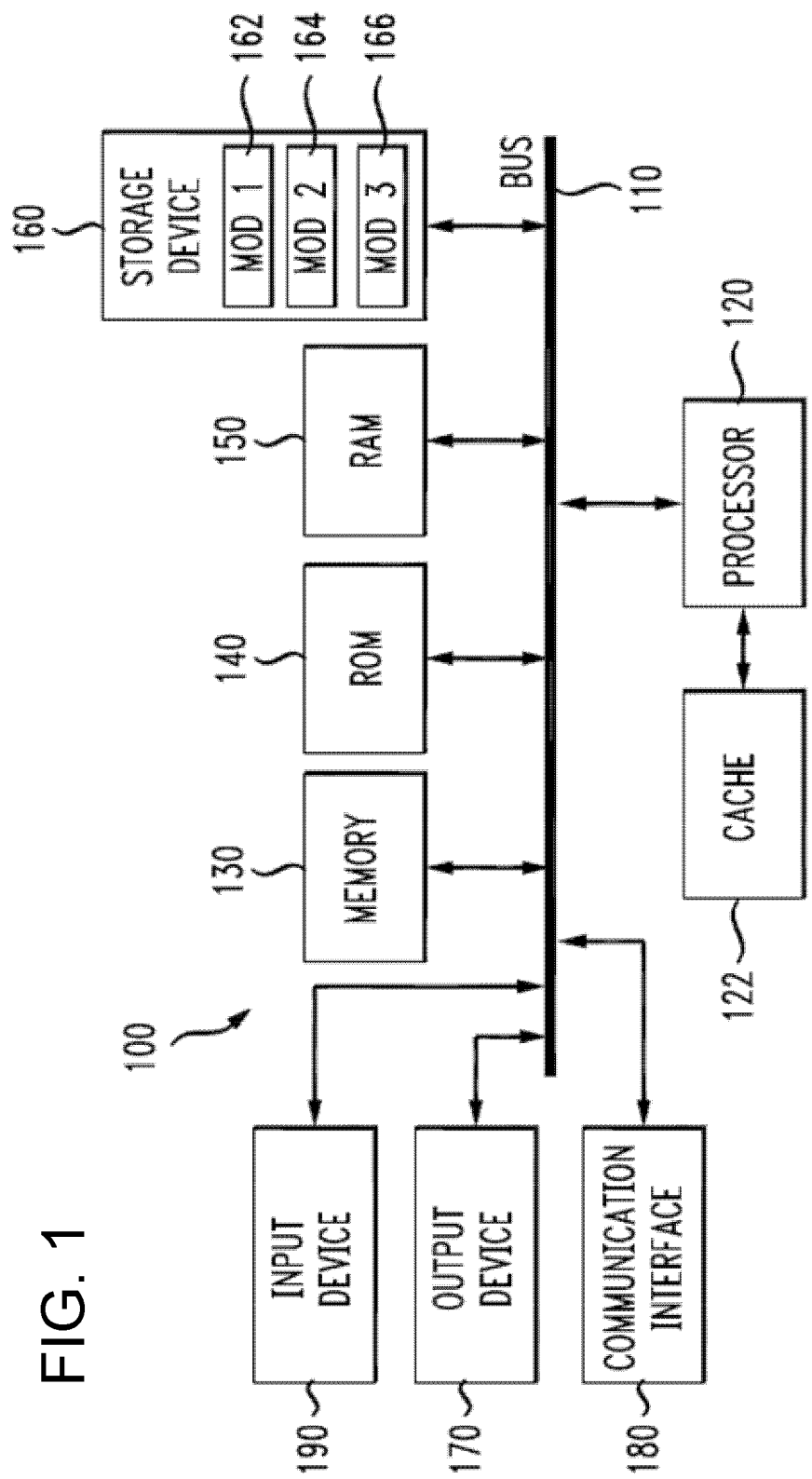
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
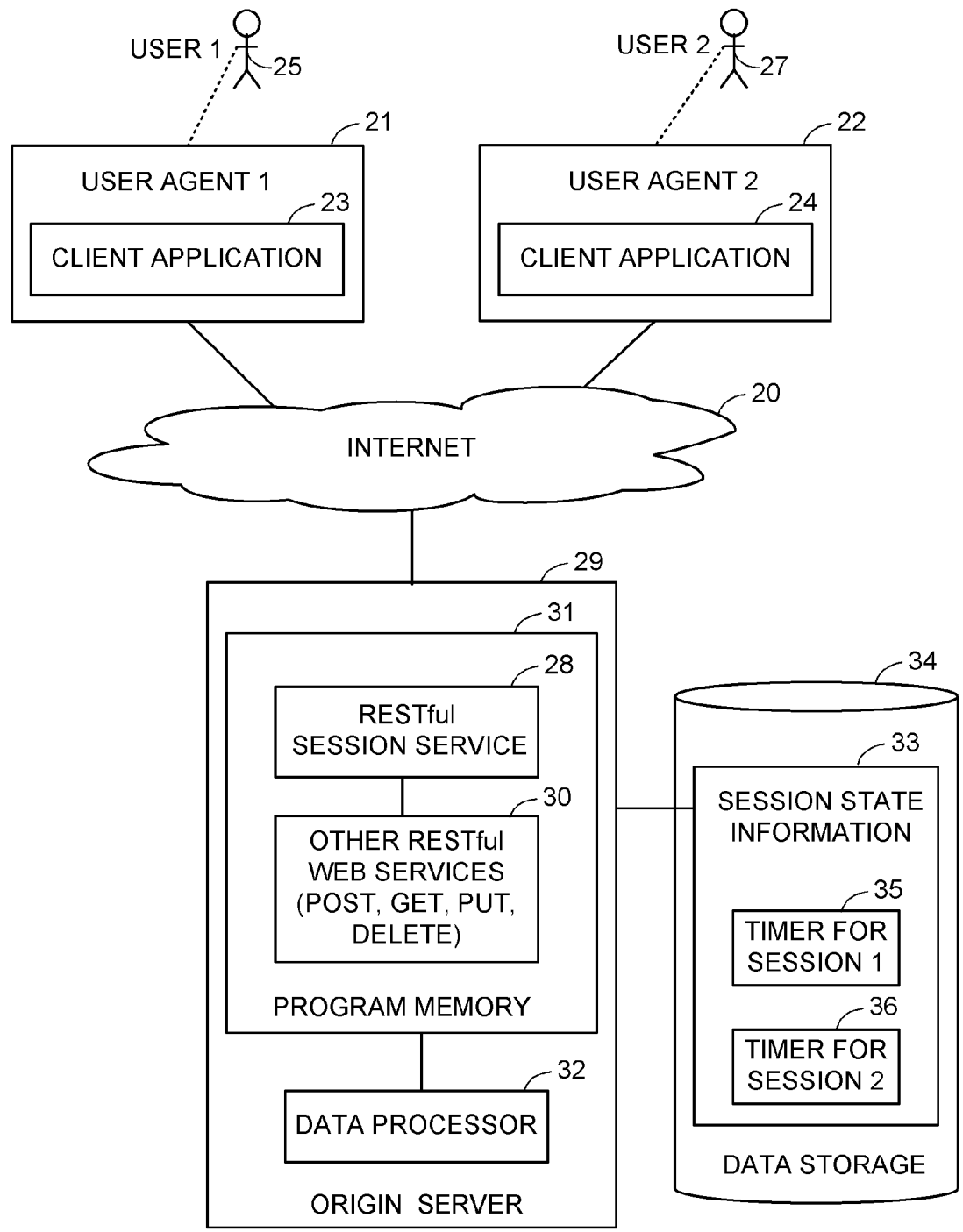
FIG. 2 illustrates the example system embodiment as used in the Internet.

Having disclosed some components of a computing system, the disclosure now turns to FIG. 2, which illustrates the Internet 20 linking a first user agent 21 and a second user agent 22 to an origin server 29. In a preferred implementation, each of the user agents 21, 22 and the origin server 29 is a programmed computing system as shown in FIG. 1. The Internet 21 may include network components, such as routers (not shown), and Web components, such as proxy servers and gateways (not show), interposed between the user agents 21, 22, and the origin server 29. Each of the network components and Web components of the Internet 20 may also be a programmed computing system as shown in FIG. 1.

The present disclosure addresses the need in the art for a standard way to establish sessions for web services. The various techniques that have been developed to address the session issue on the Web, such as HTTP cookie, URI rewrite, hidden form field, etc., were designed for human-to-machine interactions, and were not designed for machine-to-machine interactions such as communication services. In communication services, for example, both client and server should be able to control, access, and monitor the sessions. Moreover, the sessions can contain arbitrary data defined by the services. Furthermore, the sessions should be able to compose with other web services following the REST principles.

In the system of FIG. 2, for communicating data over the Internet 20 between the first user agent 21 and the second user agent 22, the first user agent 21 has a first instance 23 of a client application 23, and the second user agent 22 has a second instance 24 of the client application. The client application 23, 24, for example, is a web conference application for enabling a first human user 25 of the user agent 21 to communicate with a second human user 27 of the second user agent 22 by exchanging voice data, video, text, and documents over the Internet 20 in real time.

In order to establish a session for communication of data between the user agents 21, 22, the client application 23, 24 in one of the user agents 21, 22 invokes a RESTful session service 28 of an origin server 29. The RESTful session service 28 is exposed as a resource by having an associated URI, and the RESTful session service 28 is composed with other RESTful web services 30, such as the POST, GET, PUT, and DELETE web services.

The RESTful session service 28 and the other RESTful web services 30 are implemented as programs of computer instructions stored in program memory 31 of the origin server 29. The origin server 29 has a data processor 32 for executing the programs in the program memory 31 to provide the web services to the user agents 21, 22.

Once the session is established, the RESTful session service 28 is subsequently invoked by the client application 23, 24 in the first user agent 21 or in the second user agent 22 during the exchange of the data between the first instance of client application 23, and the second instance of the client application 24. For the case of a web conference application 23, 24, the establishment of the session permits session state information 33 to be preserved in data storage 34 of the origin server 29 for access by the user agents 21, 22 and possibly by other user agents (not shown) in the Internet 20 during the session.

The session state information 33, for example, includes a session timer for each session, such as a timer 35 for a first session, and a timer 36 for a second session. The timer for each session is initially set when a session is created, and upon expiration of the session timer, the origin server 29 deletes the session by de-allocating the data storage 34 allocated for storing the session state information. In other words, deletion of a session includes recovery of resources that were allocated to the session when the session was created.

The session state information 33 permits the session to be continued when the user agents 21, 22 crash and are rebooted, and when additional user agents (not shown) are added to the web conference and the original user agents 21, 22 are dropped from the web conference. For example, the user agents 21, 22 are mobile wireless computers or smart phones having Internet Protocol (IP) addresses that may change when the user agents crash and are rebooted, or when the user agents move to different geographic locations.

FIG. 3 shows session resources 200 of a preferred implementation of the RESTful session service (28 in FIG. 2). The RESTful session service involves a session factory having a URI template of "session_factory" 201, and individual sessions having a URI template of "session/{session}" 202. The methods of the RESTful session service are composed from the HTTP standard POST, GET, PUT, and DELETE methods.

The HTTP standard POST, GET, PUT, and DELETE methods are defined in Fielding et al., Request for Comments 2161. In general, the POST method is used to request that the origin server accept the entity enclosed in the request as a new subordinate of the resource identified by the Request-URI in the Request-Line. The GET method is used to retrieve whatever information (in the form of an entity) is identified by the Request-URI. The PUT method requests that the enclosed entity be stored under the supplied Request-URI. If the PUT method creates a new resource, then the origin server must inform the user agent via the 201 (Created) response. If the PUT method modifies an existing resource, then either the 200 (OK) or 204 (No Content) response codes should be sent to indicate successful completion of the request. The DELETE method requests that the origin server delete the resource identified by the Request-URI.

In the session factory 201, the POST method 203 is used to create a session, and the GET method is used to return a list of the existing session resources.

For an individual session, the GET method 205 is used to retrieve the session, and the DELETE method 207 is used to delete the session. For an individual session, the PUT method 206 is overloaded to support three different services (suspend, resume, and renew) as they merely change the state of a session resource. For example, the "suspend" service stops a session timer for the session, the "resume" service restarts the session timer for the session, and "renew" resets the session timer for the session.

For example, for any resource "r" with relative URI "u" within a session, its relative URI becomes "/session/{session}/u". If the session does not exist, then the URI would be invalid. The server can also match the URI with a client's credentials to determine if the client is authorized to access a session. Depending on the service, each subordinate resource in a session can be interpreted as either a copy or a reference to some resource. When the session is terminated, the service can reclaim the resources within the session accordingly. By using a timeout, a server can also release dangling sessions in case the client dies. In the case of CSTA, for example, the monitors and registrations within a session should be deleted when a session terminates, whereas the devices within a session should not, as they are shared by different sessions.

Figure 4:
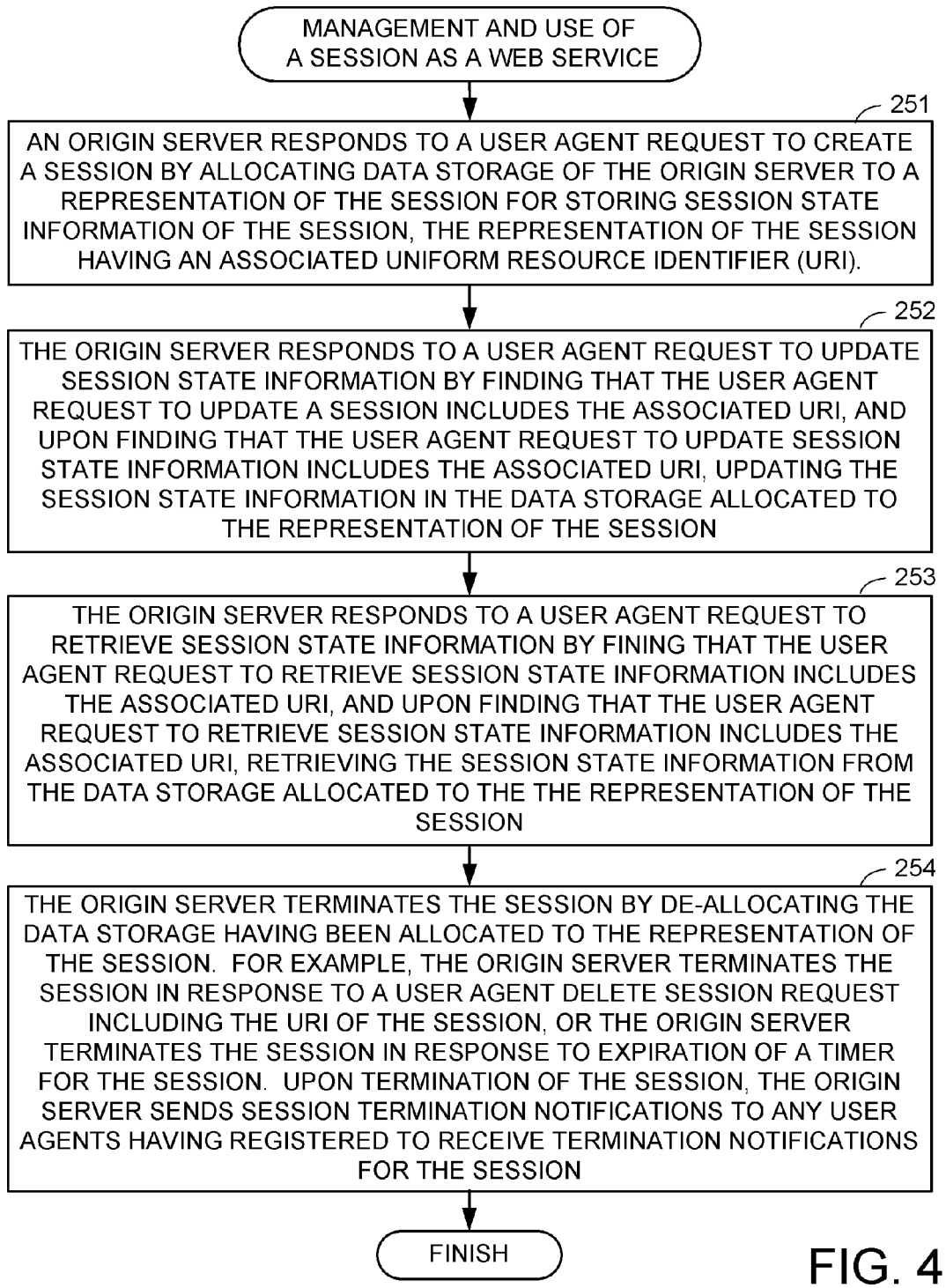
FIG. 4 illustrates an example method embodiment managing and using a session as a web service.

FIG. 4 shows the basic method embodiment of management and use of a session as a web service. The steps outlined herein are exemplary and can be implemented in any combination thereof, including combinations that exclude, add, or modify certain steps. In a first step 251, an origin server responds to a user agent request to create a session by allocating data storage of the origin server to a representation of the session for storing session state information of the session, the representation of the session having an associated Uniform Resource Identifier (URI).

In step 252, the origin server responds to a user agent request to update session state information by finding that the user agent request to update a session includes the associated URI, and upon finding that the user agent request to update session state information includes the associated URI, updating session state information in the data storage allocated to the representation of the session.

In step 253, the origin server responds to a user agent request to retrieve session state information by finding that the user agent request to retrieve session state information includes the associated URI, and upon finding that the user agent request to retrieve session state information includes the associated URI, retrieving session state information from the data storage allocated to the representation of the session.

Finally, in step 254, the origin server terminates the session by de-allocating the data storage having been allocated to the representation of the session. For example, the origin server terminates the session in response to a user agent delete session request including the URI of the session, or the origin server terminates the session in response to expiration of a timer for the session. Upon termination of the session, the origin server sends session termination notifications to any user agents having registered to receive termination notifications for the session.

In a preferred implementation, the session factory POST method 203 has a request body containing the following XML template, where " . . . " indicate extension points:

```
<ns:session xmlns:ns="http://www.example.com">
    <ns:max_duration>xs:duration</ns:max_duration>
    ...
</ns:session>
```
where
    <max_duration>: specifies the requested duration of the session.

The session termination event is generated when the session terminates prematurely. It has the following XML template:

```
<ns:session_terminated xmlns:ns="http://www.example.com">
    <ns:session>xs:anyURI</ns:session>
    <ns:reason>xs:string</ns:reason>
    ...
</ns:session>
```
Where
    <session>: identifies the session resource that terminated.
    <reason>: describes the reason of termination.

If the POST operation succeeds, the response returns HTTP status code 201 and the URI <session> to the newly created session resource in the HTTP Location Header. The HTTP response body contains:

```
<ns:session xmlns:ns="http://www.example.com">
    <ns:duration>xs:duration</ns:duration>
    <ns:on_terminate>xs:anyURI</ns:on_terminate>?
    ...
</ns:session>
```

-continued where
    <duration>: specifies the duration granted by the server, which may or may not be equal to the requested duration.
    <on_terminate>: when present with a valid URI, the element indicates the session observer resource from which the client can receive the session_terminated event. The observer resource can be the session itself.

On failure of the POST operation, proper HTTP client error code 4xx or server error code 5xx is returned.

The session factory is responsible to terminate the session upon expiry.

In a preferred implementation, the session factory GET method 204 has a request body that is empty.

On success of the session factory GET method 204, the response has HTTP status code 200. The returned representation has the following XML template:

```
<ns:sessions xmlns:ns="http://www.example.com">
    <ns:session>
        <ns:max_duration>xs:duration</ns:max_duration>
        <ns:on_terminate>xs:anyURI</ns:on_terminate>?
    </ns:session>*
</ns:sessions>
```

On failure of the session factory GET method 204, a proper HTTP error code is returned.

In a preferred implementation, the session resource GET request has a body that is empty. On success f the GET operation, the response body contains the same XML template as described above in the response to the POST request. If the session was moved, a proper HTTP 3xx status code is returned. On failure of the GET operation, a proper HTTP error code is returned.

In a preferred implementation, the session resource PUT request has a body that contains the same XML template as described above for the POST method. On success, the status code 200 is returned and the response body is the same as the response body for the response to the POST request. If the session was moved, a proper HTTP 3xx status code is returned. On failure, a proper HTTP error code is returned.

In a preferred implementation, the session resource DELETE request has a request body that is empty. On success, a status code 200 is returned. The server is responsible to release any client states associated with the deleted session. If the session was moved, a proper HTTP 3xx status code is returned. On failure, a proper HTTP error code is returned.

In the preferred implementation, XML is used to describe resource representations. However, other representations that maintain the XML Infoset of these XML templates can also be used, such as JSON, (X) HTML or key-value pairs. The clients can use HTTP content negotiation to retrieve the desired format.

In the preferred implementation, the returned <session> URI may not be in the same domain as the <session_factory>. Combined with HTTP redirection, this would allow some services to delegate their session management to a shared session factory.

To receive the session terminated event, a client can subscribe to the session observer resource. One way to achieve this is to use W3C Server-Sent Events.

Figure 5:
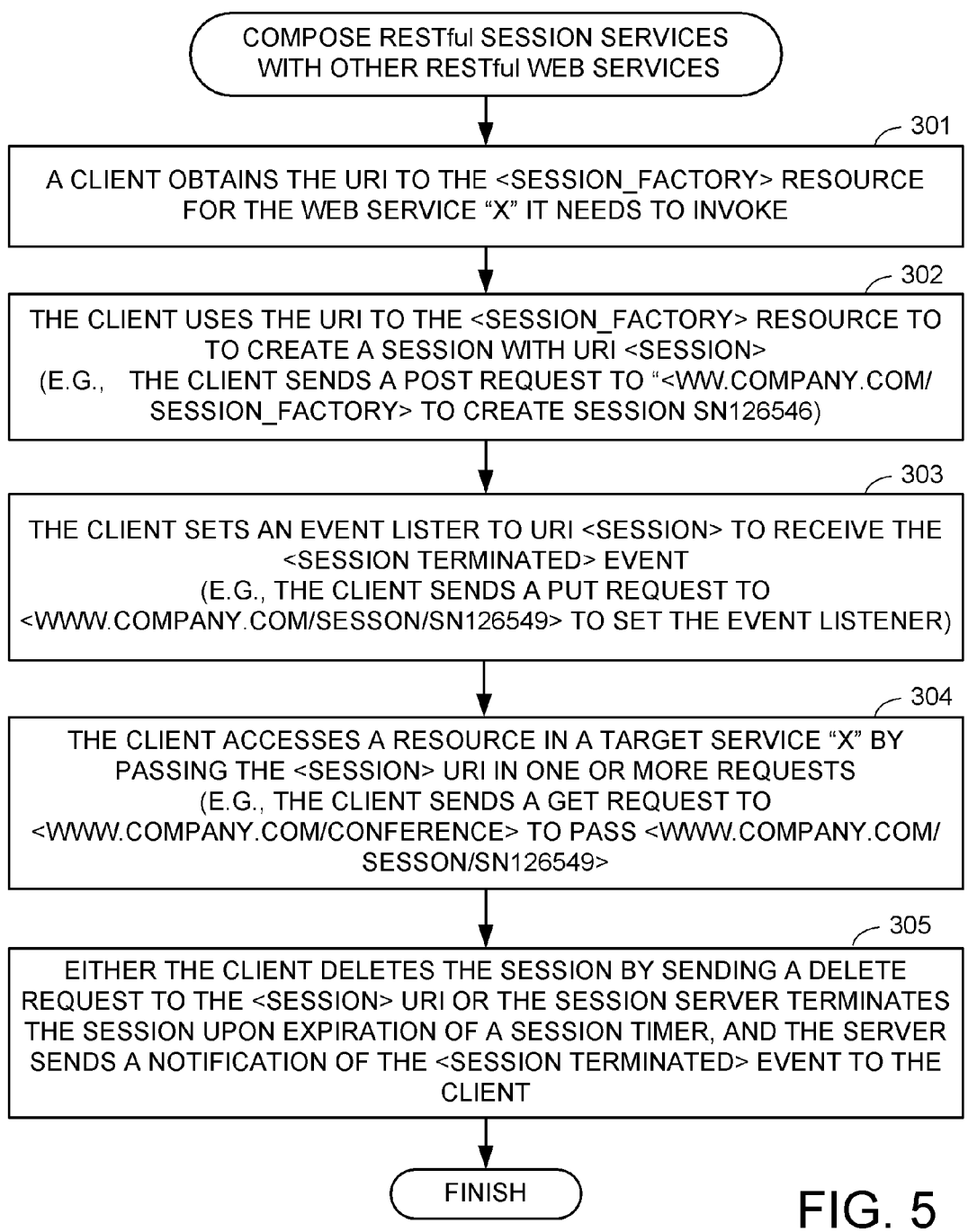
FIG. 5 illustrates use of the method embodiment for composing session services with web services.

The session services described above can be composed with other RESTful web services to maintain the client states for those other services. A typical sequence of operations to achieve this composition is shown in FIG. 5. In a first step 301, a client obtains the URI to the <session_factory> resource for the web resource for the web service X it needs to invoke. Next, in step 302, the client uses the URI to the <session_factory> resource to create a session with URI <session>. For example, the session factory server is at URI <www.company.com/session_factory> and a POST request is sent to the session factory server to create a session "SN126546" stored at <www.company.com/session/SN126546>. In step 303, the client sets an event listener to URI <session> to receive the <session terminated> event. For example, the client sends a PUT request to <www.company.com/session/SN126546> to turn the event listener "on" in the session state. In step 304, the client accesses a resource in a target service "X" by passing the <session> URI in one or more requests. For example, the target service "X" is a conference service at <www.company.com/conference>, and the client sends a GET request to <www.company.com/conference> to pass the URI <www.company.com/session/SN126549>. Finally, in step 305, either the client deletes the session by sending a DELETE request to the <session> URI or the session server terminates the session upon expiration of a session timer.

Figure 6:
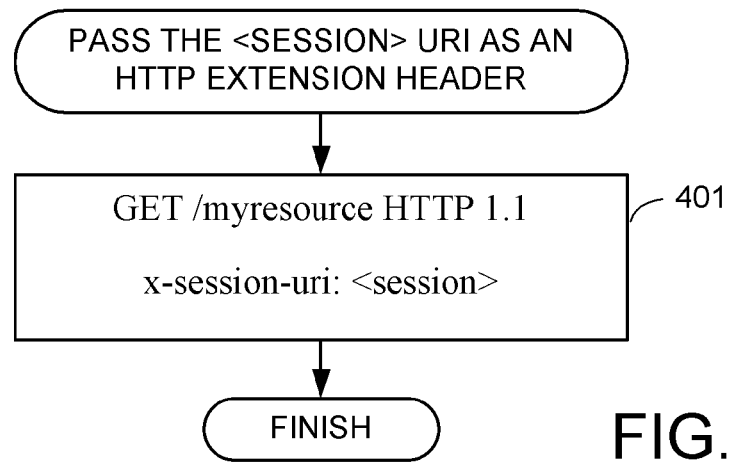
FIG. 6 illustrates a way of passing a session URI as a Hypertext Transfer Protocol (HTTP) session header.

There are at least three ways to pass the <session> URI to the target service. One way, as shown in FIG. 6, step 401, is to pass the <session> URI as an HTTP extension header. For example, to GET a resource at URI/myresource, the request would look like:
GET/myresource HTTP 1.1
x-session-uri: <session>

Figure 7:
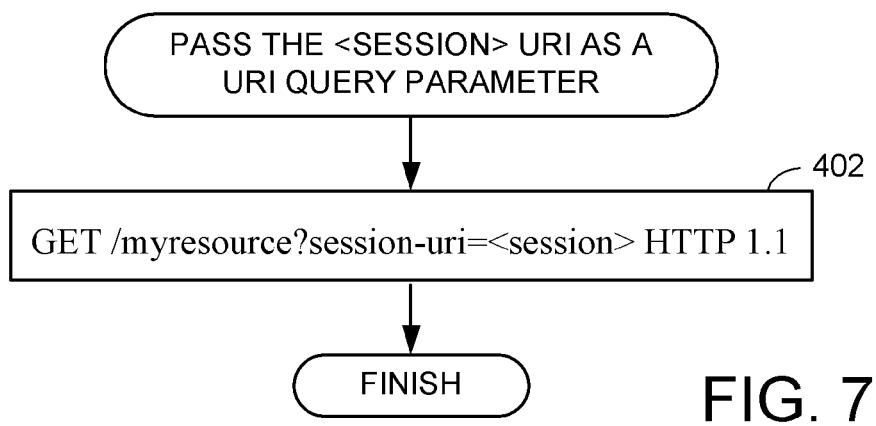
FIG. 7 illustrates a way of passing a session URI as a URI query parameter.

A second way, as shown in FIG. 7, step 402, is to pass the <session> URI as a URI query parameter. For example, to GET a resource at URI/myresource, the request would look like:
GET/myresource?session-uri=<session> HTTP1.1

Figure 8:
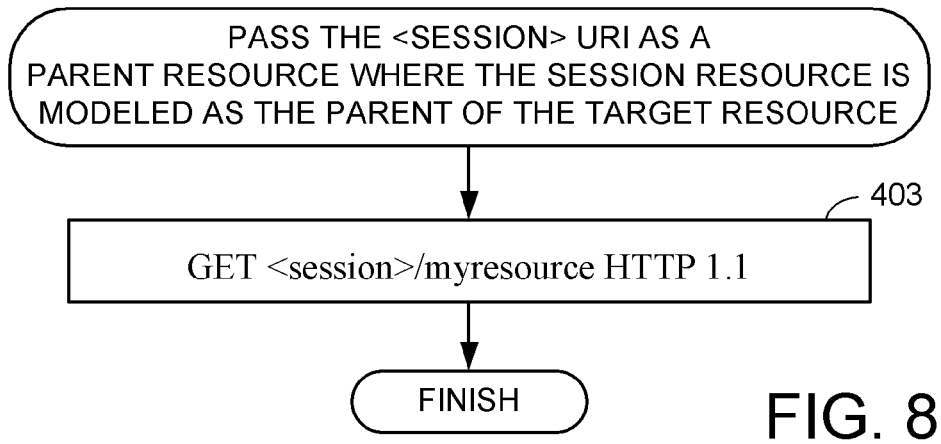
FIG. 8 illustrates a way of passing a session URI as a parent resource where the session resource is modeled as the parent of the target resource.

A third way, as shown in FIG. 8, step 403, is to pass the <session> URI as a parent resource where the session resource is modeled as the parent of the target resource. For example, to GET a resource at URI/myresource, the request would look like:
GET <session>/myresource HTTP1.1

Nested sessions can also be created with the RESTful session service (38 in FIG. 2). For example, the Computer Supported Telecommunications Applications (CSTA) as defined in EMCA-269, 8th edition, Services for Computer Supported Telecommunication Applications, June 2009, has various message and behavior patterns that include session message exchange patterns and can be composed with sessions provided by the RESTful session service (38 in FIG. 2).

In CSTA, A session message exchange pattern has a sequence of messages:
    1. start session [C<- -> S]
    2. resume|suspend|renew session [C<--> S]*
    3. terminate session [C<--> S].

Session is used in CSTA for two purposes: 1) to discriminate concurrent interactions of the same type; and 2) to manage the lifetime of certain resources. Many services can be classified as session according to these two criteria, including registrations, Routing, I/O, Call Detail Report, and Location Services. There is also a top level session (association) for all interactions between the client and server. Once this top-level session is terminated, the monitors and registrations created in that session will be removed as well. In this sense, many CSTA interactions happen within nested sessions. A session hierarchy may simplify the CSTA services by replacing many of its ad-hoc sessions. Another benefit of this session hierarchy is that events from the subordinate resources can bubble up to the parent session, so that one event listener can be registered for all events within the top-level session.

Since the RESTful sessions are resources, servers knows the client states while still being stateless, making them robust and scalable. This approach thus avoids the pitfalls of the HTTP cookie, which is not a resource and cannot be controlled by the client in a standard way. Because a session can be persisted, a server can restore the sessions after reboot. Composing with a common session service removes the need for each service to develop its own ad-hoc session mechanisms, which will complicate the service and decrease the interoperability of the services.

Composition in REST can be more efficient than in Simple Object Access Protocol (SOAP). In SOAP services, since one message carries payloads of all composed services, every time a new service is composed the message has to be changed accordingly and examined by all service modules. In contrast, service compositions in REST can be achieved in the resource level instead of the message level. As a result, REST compositions need not modify the messages at all and different messages can be handled by different resources. For instance, the messages to and from the resource "r" can be the same regardless if "r" is composed with the session service or not.

Figure 9:
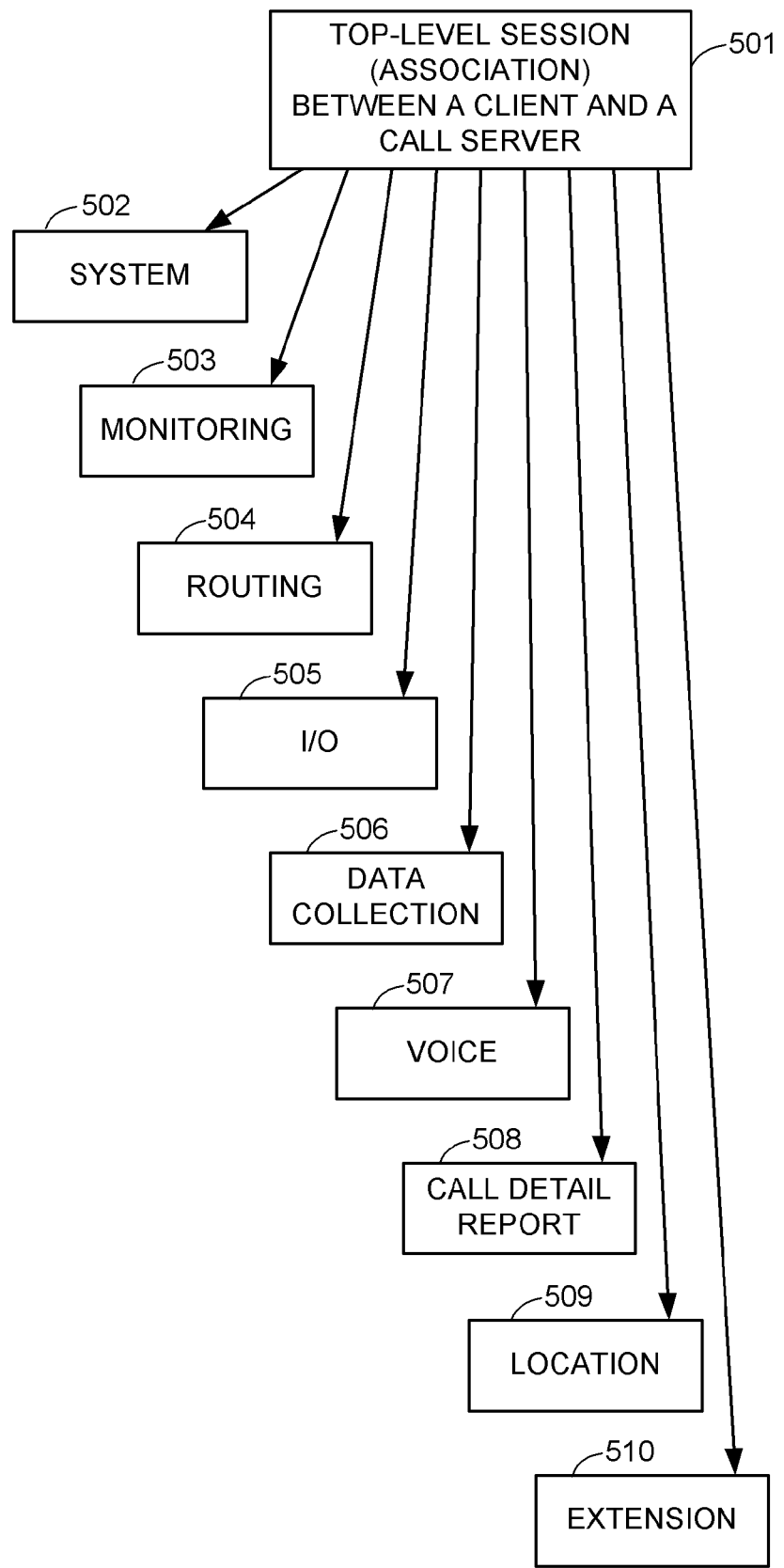
FIG. 9 illustrates nested sessions for a call service.

FIG. 9, for example, shows a hierarchy of the CSTA message and behavior patterns that could have their state information stored as subsidiary resources of a top-level session (association) 501 for all interactions between a client initiating a call according to CSTA. The top-level session 501 would persist for the duration of the call. The top-level session 501 has a corresponding RESTful session provided by the RESTful session service (38 in FIG. 2). Each subsidiary resource would have a respective relative URI "u" within the top-level session, so that each subsidiary resource would correspond to a nested session nested within the to-level session.

For example, as shown in FIG. 9, there are subsidiary resources for the system 502 handling the call, monitoring 503 of the call, routing 504 of the call, input-output (I/O) 505 of data exchanged during the call, collection of data 506 about the call, exchange of data 507 representing voice during the call, a call detail report 508 about the call, location 509 of the human participants of the call, and an extension 510 of the call.

For example, if the session state information about the top-level session is accessed at a URL of <www.company.com/session/SN128947>, and the relative URI for the call detail report 508 is <call_detail>, then the session state information for the call detail report 508 would be accessed at a URL of <www.company.com/session/SN128947/call_detail>.

In view of the above, there has been described a method and system for RESTful session management that offers clients with the ability to control, monitor and access the sessions in a standard way. The sessions can be shared among applications, clients, and servers. The shared ownership is important to many applications, especially in communication protocols and systems. The method and system for RESTful session management exposes sessions as resources that support uniform interface. As resources addressable by URI, sessions can be connected easily with other applications and resources. This connectedness promotes reusability, discoverability, and ability to create new services. For example, a session URI can be passed around in a message to invite other parties to join the session. The RESTful sessions can be composed with other services in flexible ways to unify the current approaches to session management as RESTful web services.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:

in response to a first user agent request to create a session for communication of data between user agents, allocating data storage of an origin server to a representation of the session, the data storage being allocated for storing session state information of the session, and the representation of the session having an associated uniform resource identifier, wherein the session is configured to preserve session state information via the data storage, wherein the session state information comprises a session timer for the session, and wherein the session is configured to expire in response to expiration of the session timer;

in response to a second user agent request to update the session state information of the session, updating the session state information based on a first determination that the second user agent request to update the session state information comprises the associated uniform resource identifier;

in response to a third user agent request to retrieve the session state information, retrieving the session state information from the data storage based on a second determination that the third user agent request to retrieve the session state information comprises the associated uniform resource identifier; and terminating the session by de-allocating the data storage; and wherein the session comprises a web-based collaboration in which a first human user of the first user agent communicates, in real-time, with a second human user of the second user agent.

2. The method as claimed in claim 1, wherein each step in the method is compliant with all constraints of a representational state transfer.

3. The method as claimed in claim 1, wherein the first user agent request to create a session is a hypertext transfer protocol POST request, and wherein allocating the data storage comprises finding that the POST request includes a uniform resource identifier identifying a session factory service of the origin server, and creating the session upon finding that the POST request includes the uniform resource identifier identifying the session factory service of the origin server.

4. The method as claimed in claim 1, wherein updating the session state information comprises finding that the second user agent request to update the session is a hypertext transfer protocol PUT request including the associated uniform resource identifier, and wherein retrieving the session state information comprises finding that the third user agent request to retrieve session state information is a hypertext transfer protocol PUT request including the associated uniform resource identifier.

5. The method as claimed in claim 1, wherein updating the session state information comprises updating session state information to set an event listener for the session and for a user agent having originated the second user agent request to update session state information, and wherein terminating the session comprises sending a notification of a session terminated event to the user agent having originated the second user agent request to update session state information.

6. The method as claimed in claim 1, wherein terminating the session is performed in response to a fourth user agent request to delete the session upon finding that the fourth user agent request to delete the session includes the associated uniform resource identifier.

7. The method as claimed in claim 1, wherein terminating the session is performed in response to an expiration of the session timer and wherein the session includes an exchange of voice or video data between the user agents in real-time.

8. A system comprising:

a processor; and a computer-readable storage medium having stored therein instructions which, when executed by the processor, cause the processor to perform operations comprising:

responding to a first user agent request to create a session for exchanging data between user agents in real-time by allocating data storage associated with an origin server to a representation of the session for storing session state information of the session, the representation of the session having an associated uniform resource identifier, wherein the session preserves session state information via the data storage, wherein the session state information comprises a session timer for the session, and wherein the session expires in response to expiration of the session timer;

in response to a second user agent request to update session state information, updating the session state information in the data storage allocated to the representation of the session upon finding that the user agent request to update the session includes the associated uniform resource identifier;

in response to a third user agent request to retrieve the session state information, retrieving the session state information from the data storage based on a second determination that the third user agent request to retrieve the session state information includes the associated uniform resource identifier; and terminating the session by de-allocating the data storage; and wherein the session comprises a web conference in which a first human user of the first user agent communicates at least one of voice and video with a second human user of the second user agent.

9. The system as claimed in claim 8, wherein each of the operations is compliant with all constraints of representational state transfer.

10. The system as claimed in claim 8, wherein the first user agent request to create a session is a hypertext transfer protocol POST request, and allocating the data storage includes finding that the POST request includes a uniform resource identifier identifying a session factory service of the origin server, and creating the session upon finding that the POST request includes the uniform resource identifier identifying the session factory service of the origin server.

11. The system as claimed in claim 8, wherein updating the session state information includes finding that the second user agent request to update a session is a hypertext transfer protocol PUT request including the associated uniform resource identifier, and wherein retrieving the session state information includes finding that the third user agent request to retrieve session state information is a hypertext transfer protocol PUT request including the associated uniform resource identifier.

12. The system as claimed in claim 8, wherein updating the session state information includes updating session state information to set an event listener for the session and for a user agent having originated the second user agent request to update session state information, and terminating the session further includes sending a notification of a session terminated event to the user agent having originated the user agent request to update session state information.

13. The system as claimed in claim 8, wherein terminating the session is performed in response to a fourth user agent request to delete a session upon finding that the fourth user agent request to delete a session including the associated Uniform Resource Identifier.

14. The system as claimed in claim 8, wherein terminating the session is performed in response to an expiration of the session timer.

15. A non-transitory computer-readable storage medium having stored therein instructions which, when executed by a processor, cause the processor to perform operations comprising:

in response to a first user agent request to create a session for exchanging data between user agents in real-time, allocating data storage of an origin server to a representation of the session, the data storage being allocated for storing session state information of the session, and the representation of the session having an associated uniform resource identifier, wherein the session is configured to preserve session state information via the data storage, wherein the session state information comprises a session timer for the session, and wherein the session is configured to expire in response to expiration of the session timer;

in response to a second user agent request to update the session state information of the session, updating the session state information based on a first determination that the second user agent request to update the session state information includes the associated uniform resource identifier;

in response to a third user agent request to retrieve the session state information, retrieving the session state information from the data storage based on a second determination that the third user agent request to retrieve the session state information includes the associated uniform resource identifier; and terminating the session by de-allocating the data storage; and wherein the session comprises a web conference in which a first human user of the first user agent communicates at least one of voice and video with a second human user of the second user agent.

16. The non-transitory computer-readable storage medium as claimed in claim 15, wherein the operations are compliant with all constraints of representational state transfer.

17. The non-transitory computer-readable storage medium as claimed in claim 15, wherein the first user agent request to create a session is a hypertext transfer protocol POST request, and allocating data storage includes finding that the POST request includes a uniform resource identifier identifying a session factory service of the origin server, and creating the session upon finding that the POST request includes the uniform resource identifier identifying the session factory service of the origin server.

18. The non-transitory computer-readable storage medium as claimed in claim 15, wherein updating the session state information includes finding that the second user agent request to update a session is a hypertext transfer protocol PUT request including the associated uniform resource identifier, and wherein retrieving the session state information includes finding that the third user agent request to retrieve session state information is a hypertext transfer protocol PUT request including the associated uniform resource identifier.

19. The non-transitory computer-readable storage medium as claimed in claim 15, wherein updating the session state information includes updating session state information to set an event listener for the session and for a user agent having originated the second user agent request to update session state information, and terminating the session further includes sending a notification of a session terminated event to the user agent having originated the second user agent request to update session state information.

20. The non-transitory computer-readable storage medium as claimed in claim 15, wherein terminating the session is performed in response to a fourth user agent request to delete a session upon finding that the fourth user agent request to delete a session comprising the associated uniform resource identifier.

* * * * *